United States Patent

[11] 3,634,660

| [72] | Inventors | James M. Moran<br>Leominster;<br>Robert J. Saul, Boston, both of Mass. |
|---|---|---|
| [21] | Appl. No. | 53,570 |
| [22] | Filed | July 9, 1970 |
| [45] | Patented | Jan. 11, 1972 |
| [73] | Assignee | Glass Container Industry Research Corporation<br>New Castle, Pa. |

[54] I. S. MACHINE CONTROL SYSTEM
8 Claims, 5 Drawing Figs.

[52] U.S. Cl. .................................................. 235/151.1,
318/568, 65/158
[51] Int. Cl. .................................................. G05b 19/16,
G04c 23/26
[50] Field of Search .......................................... 235/151.1;
65/160, 158, DIG. 13; 340/174.1 P, 174.1 L;
318/568

[56] References Cited
UNITED STATES PATENTS

| 3,265,946 | 8/1966 | Johnson et al. | 318/568 X |
| 3,291,971 | 12/1966 | Dunne | 235/151.1 |
| 3,391,275 | 7/1968 | Bullock et al. | 235/151.1 |

Primary Examiner—Malcolm A. Morrison
Assistant Examiner—James F. Gottman
Attorney—Watson, Leavenworth & Kelton ABSTRACT: A system for directing operation of the individual sections of a glass container making machine for initiating and discontinuing section operation at preestablished times in the machine operating cycle and, upon demand, at other times in said cycle. Storage means containing a preestablished cam is associated with each section and section operation is initiated and discontinued in accordance with the cam, the time characteristics of the cam being modified by a cam-trimming system upon said demand.

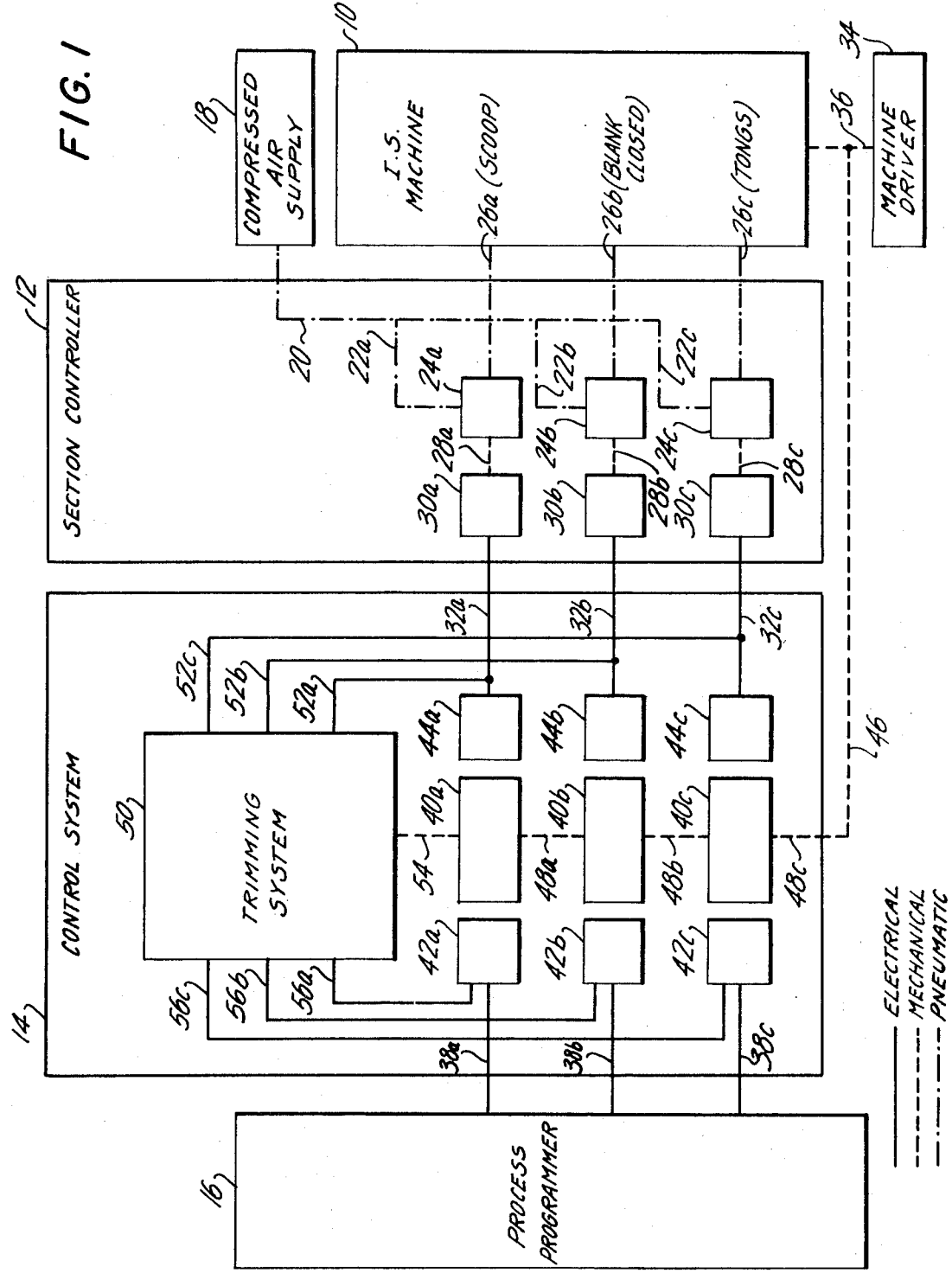

I. S. MACHINE CONTROL SYSTEM

BACKGROUND OF THE INVENTION

1. Field of the Invention

This invention relates to glass container manufacture and more particularly to a system for controlling the operation of glass container manufacturing equipment.

2. Description of the Prior Art

The most commonly employed machine for glass container manufacture is the individual section (I.S.) machine wherein the various individual operations involved in glass container manufacture are sequentially performed in successive individual sections, each of which is operative during a particular segment of the entire cycle required for manufacture of an individual container. In its formation the container is transported through the machine by a conveyor or like apparatus, the movement of which is controlled in conjunction with the selective energization and deenergization of the machine individual sections. Such conjunctive control is generally effected by driving the conveyor and the selective section energization means from a common supply. The section selective controller is typically in the form of a cylindrical drum, the periphery of which contains successive sets of mechanical cams radially disposed about the drum periphery to precisely initiate and discontinue the operation of each section. Each section is equipped with a spool valve respectively initiating and discontinuing said section operation. These valves are actuated through lever-latch mechanisms by drum-mounted projections or tripping devices defining each cam and, when actuated, the valves selectively conduct pressurized air to associated section-operating mechanisms which perform the process function assigned to that section.

Since the duration of operation of each section of the I.S. machine and the relative time of initiation and discontinuance of same in the machine cycle is required to be variable in the light of changes in the structure or character of the container then being manufactured, and further in respect of environmental changes in the plant, e.g., temperature, humidity, etc., it has heretofore been customary to incorporate cam-varying structure in the timing drum. Thus, mechanism has been incorporated in the timing drums for varying the positions of said tripping device about the drum periphery. Such cam varying will be referred to hereinafter as "trimming" the timing drum.

Early efforts in providing trimming involved the provision of a drum having insertable-retractable bolts on the drum periphery as illustrated in U.S. Pat. Nos. 1,911,119 and 2,511,184. While such bolts were readily positioned prior to the start of a given machine cycle, serious difficulties attended efforts at modifying the positions thereof during machine operation including operational hazards involved in attempting to modify bolt position quickly in close quarters, operational error in reinsertion of retracted bolts and frequent shutdown to accommodate change. Other efforts substantially alleviating these difficulties have involved the use of mechanically shiftable solenoid-tripping mechanisms as illustrated in U.S. Pat. Nos. 1,981,937 and 1,611,063. While some electrical controllers have been introduced in trimming systems (U.S. Pat. No. 2,269,391) such systems rely extensively upon the basic timing drum and mechanical trimming apparatus.

In all presently known arrangements the timing drum remains essentially a mechanical tripping element having a trimming facility provided at inordinate expense attending the complex tripping element shifting mechanisms illustrated in the prior art. Apart from manufacturing cost, maintenance of these systems is problematic and the accuracy provided is less than that currently demanded by the industry. Accuracy in cam adjustment in the order of 2° is clearly beyond the capacity of existing devices.

SUMMARY OF THE INVENTION

It is an object of the present invention to provide an improved control system for directing the operation of the individual sections of an I.S. machine.

It is a further object of this invention to provide an improved control system for initial setting and expeditious variation of cams controlling the initiation and discontinuance of operation of the individual sections of an I.S. machine.

It is a further object of the invention to provide an I.S. machine trimming system and apparatus of high accuracy, limited maintenance and moderate cost.

In the efficient attainment of these and other objects there is presented in the present invention a system providing variable control for initiating and discontinuing the operation of the sections of an I.S. machine comprising a timing drum adapted for storage of a magnetic cam for each section, apparatus for continually directing the operation of each section in accordance with the cam stored for that section and further apparatus responsive to operator or machine demand for modifying the cam of a particular section whose operation is intended to be changed. Said further apparatus includes means for selective modification of said cam in respect of the leading edge thereof to advance or retard the initiation of section operation or for selective modification of said cam in respect of the trailing edge thereof to advance or retard the discontinuance of section operation, all said apparatus and means being adapted for use without interrupting normal machine operation.

The foregoing and other objects and features of the invention will be evident from the following detailed description of preferred embodiments thereof and the drawings wherein like numerals are used to identify like parts throughout.

BRIEF DESCRIPTION OF THE DRAWINGS

FIG. 1 is a functional block diagram of the control system of the invention and associated I.S. machine apparatus.

DESCRIPTION OF THE PREFERRED EMBODIMENTS

I. I.S. Machine System Structure

Figure 3:
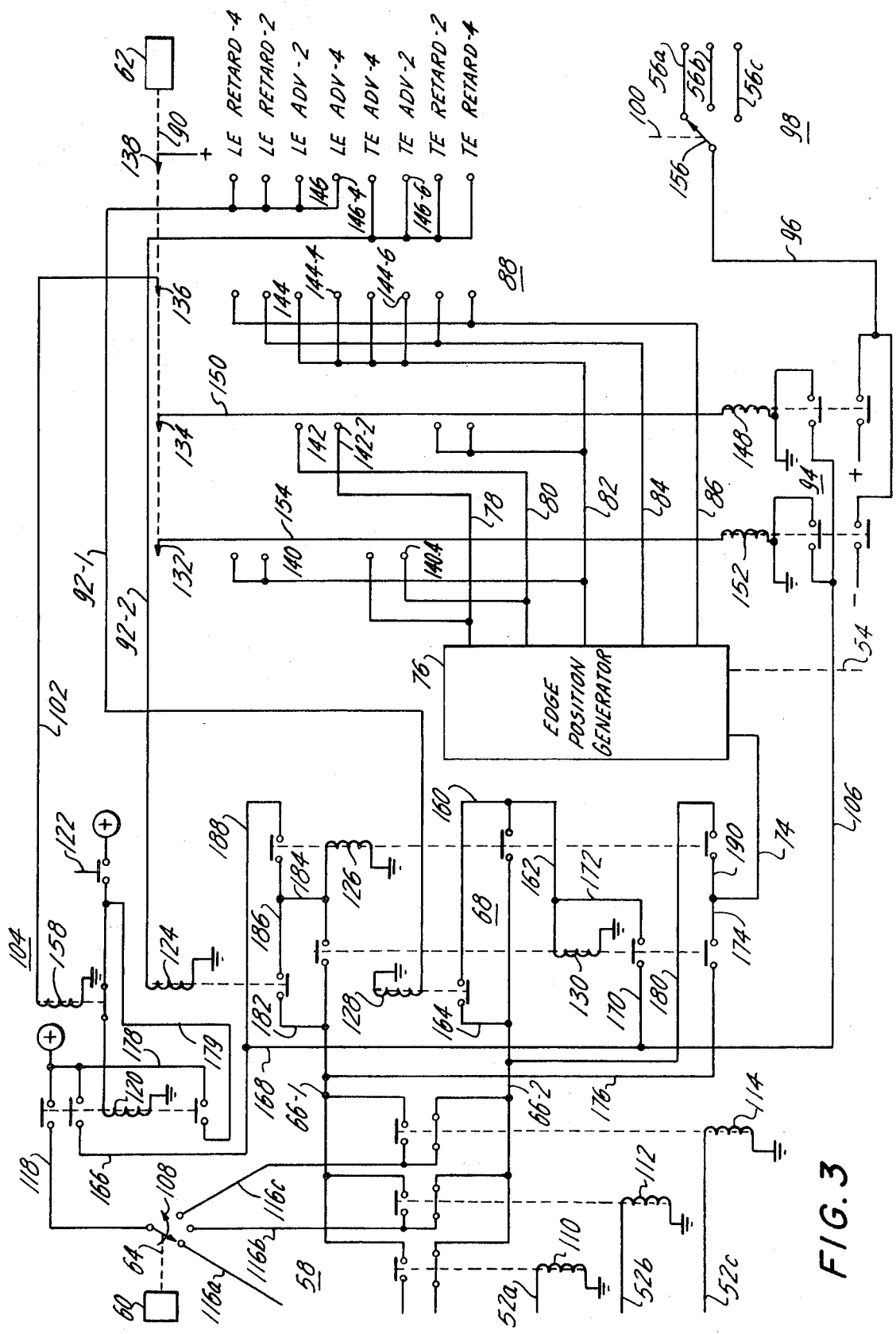
FIG. 3 is a detailed schematic diagram of a preferred embodiment of the trimming system of FIG. 2.

Referring to FIG. 1, I.S. machine 10 is illustrated therein in association with section controller 12, the subject control system 14 and a process programmer 16. The I.S. machine includes a plurality of individual sections each performing a particular function in the successive formation of a glass container. Exemplary is the initial machine section, commonly referred to as the SCOOP section, which functions to introduce molten glass into the machine for formation of a single container. Control of this machine section is accommodated by the passage of compressed air from supply 18 over lines 20, 22a to SCOOP valve 24a and thence over line 26a to the section. Valve 24a is selectively mechanically actuated by a force provided over line 28a by a solenoid 30a which is in turn operatively responsive to control signals provided on line 32a. Other typical machine sections are the BLANK CLOSED section and the TONGS section, respectively controlled by valves 24b and 24c, as actuated by solenoids 30b and 30c. Pneumatic, electrical and mechanical corresponding lines associated with these valves and solenoids are similarly identified by the letters b and c and the above reference numerals.

Up to 19 such sections may be employed in machine 10 depending upon the container being produced. The container is advanced during formation from one section to the next by a conveyor belt uniformly driven by machine driver 34 over line 36.

Control system 14 generates solenoid-tripping signals on lines 32a, 32b and 32c and at particular times during the container-making cycle of machine 10 and discontinues such signals at further defined times during the cycle as determined by magnetic cams stored therein for each section. Where section variation is not required, control system 14 repeatedly generates these signals in successive cycles and machine performance is repetitive from cycle to cycle. The initial establishment of these control signals in control system 14 is provided by process programmer 16, the programmer having a number of channels each corresponding to one of the individual sections of machine 10 and incorporating signal generator or like devices controlled by an operator to store a particularly desired cam in each of the corresponding sections of control system 14. Since the programmer does not form a part of the present invention, further structural details thereof shall not be discussed herein. Signals indicative of these cams are applied to control system 14 by programmer 16 over lines 38a, 38b and 38c.

In accordance with the present invention control system 14 includes therein a plurality of magnetic cam storage means 40a, 40b and 40c corresponding respectively to the three machine sections illustratively indicated. For purposes of entering cam information into each storage channel, control system 14 includes a cam-writing device or magnetic head for storage means, indicated by numerals 42a, 42b and 42c. The magnetic heads perform a writing or cam-entering function in response to first polarity signals applied thereto and perform an erasing function if opposite polarity signals are applied thereto. In the initial machine cam establishment the magnetic heads are responsive to the programmer signals of a cam-writing polarity.

Control system 14 further includes cam-reading elements 44a, 44b and 44c in association with the control system storage means for purposes of generating stored cam-indicating signals on lines 32a, 32b and 32c for said solenoid tripping.

In normal machine operation, once a program of cams has been entered into storage through magnetic heads 42, and storage members 40 are driven through mechanical linkage 46 and further links 48a, 48b and 48c at the same speed with which the machine advances the conveyor belt thereof, the machine sections will operate in a fixed pattern during each cycle.

II. Cam Trimming

If during the course of machine operation an operator or a machine-directing computer elects to modify machine operation in conjunction with the detection of environmental conditions demanding same, e.g., that the BLANK be closed at an earlier time in the cycle, a trimming operation is required, i.e., the magnetic cam present in the BLANK CLOSED storage means is to be altered by advancing in time the leading edge thereof while retaining the cam trailing edge in its original time position.

In accommodating such changes, trimming system 50 of the control system must be informed of the then-existing time relation of all section cams. Such information is readily provided over lines 52a, 52b and 52c same being connected to read heads 44a, 44b and 44c. The particular information representing the BLANK CLOSED cam is provided over line 52b. In performing the required alteration, trimming system 50 is informed of the instantaneous angular position of the shaft directing rotation of the storage members by connection to link 48 through link 54. In response to these electrical and mechanical inputs, trimming system 50 generates at output lines 56a, 56b and 56c signals indicative of revised cams, said lines applying such signals directly to magnetic heads 42a, 42b and 42c respectively for entry thereof in the associated storage members. In the particular example under consideration, trimming system 50 effects a trimming operation of the BLANK CLOSED channel by generating signals on line 56b indicative of an advanced time relation for the BLANK CLOSED cam which is entered through magnetic head 42b into storage channel 40b.

III. Trimming System—General Structure and Function

Figure 2:
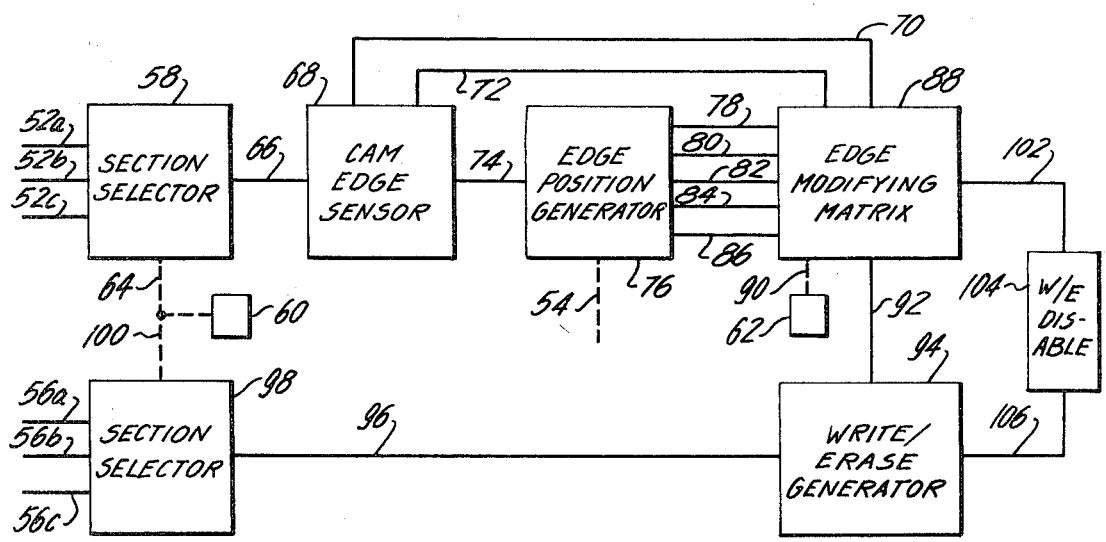
FIG. 2 is a functional block diagram of the trimming system of the control system of FIG. 1.

Trimming system 50 of FIG. 1 is illustrated by way of its functional block diagram in FIG. 2. The inputs to the trimming system are derived from lines 52 which provide electrical signals indicative of the various section magnetic cams. Mechanical input 54 is applied interiorly of the trimming system as shown and the trimming system outputs are provided on lines 56 which yield electrical signals indicative of revised cams. Further inputs to the trimming system comprise mechanical controllers 60 and 62, the former being operated to select a particular channel for trimming and the latter being operated in accordance with the magnitude of trimming and the cam edge to be trimmed, e.g., leading edge—advance 2°.

Lines 52 are applied to section selector 58 which comprises a switch operated by controller 60 through linkage 64 to connect one of lines 52 with selector output line 66. Line 66 applies the selected cam to edge sensor 68. This unit is operatively responsive to further input signals on lines 70 and 72, respectively indicative of a leading edge or a trailing edge cam revision, to provide a signal on output line 74 indicating that the cam edge desired to be trimmed is then sensed by reading heads 44. This signal is applied to edge position generator 76 which is further responsive to mechanical input 54. As will be discussed in detail hereinafter, the reading head of each section is displaced by a fixed angle from the writing head of that channel and generator 76 functions to indicate on output lines 78, 80, 82, 84 and 86 the relative position of the selected cam edge with respect to the writing head. In this connection a signal is provided on line 78 when the selected edge is 4° in advance of the writing head. A signal is generated on line 80 when the cam edge is 2° in advance of the writing head. Similarly signals are generated on lines 82, 84 and 86 when the selected cam edge is respectively at the writing head, 2° beyond, and 4° beyond the writing head.

The signals provided on lines 78–86 are applied to edge-modifying matrix 88 which is further informed of the cam revision to be accomplished by controller 62 through linkage 90. This unit responds to the mechanical controller input signal to generate the aforementioned leading edge or trailing edge revision signals on lines 70 or 72. The unit is further operative in response to the edge position signals on lines 78 through 86 in conjunction with the mechanical controller input signal to generate cam writing or erasing signals on output line 92. These signals are applied to write/erase signal generator 94 the output signals of which are conducted over line 96 to section selector 98. This unit is ganged by link 100 to controller 60 and input section selector 58 whereby the write or erase signals are applied to one of lines 56 corresponding to the channel being trimmed.

Edge-modifying matrix 88 supplies a second output signal on line 102 to write/erase disable circuit 104. This unit generates a signal on line 106 which interrupts operation of write/erase signal generator 94, discontinuing cam trimming.

In its overall operation, the trimming system of FIG. 2 selects one of the magnetic cam signals generated on lines 52, then determines which edge of the cam is to be modified, then tracks that edge in its approach to the writing head, then operates to generate signals either adding to the cam edge (writing) or detracting from the cam edge (erasing), and finally provides such signals to the writing head of the cam being trimmed. The detailed operation of the trimming system will be evident from the following discussion of FIG. 3 which illustrates the electrical schematic diagram for a preferred electromechanical embodiment of the control system wherein various relays are interconnected for performance of the various functions of the trimming system.

IV. Trimming System—Detailed Structure and Operation

For a clear understanding of the operation of the circuit of FIG. 3, it will be helpful initially to identify the particular circuit elements thereof in connection with the corresponding functional block diagram of FIG. 2. Section selector 58 is shown at the far left in FIG. 3 and includes a simple rotary switch 108 responsive to controller 60. Input lines 52a, 52b and 52c terminate respectively in relay windings 110, 112 and 114. Each relay has a normally open and a normally closed contact, both connected to one of lines 116a, 116b and 116c, the normally open contacts being further connected to line 66–1 and the normally closed contacts being connected to line 66–2 The contact arm of switch 108 is connected by line 118 through normally open contacts of a relay winding 120 to the positive power supply terminal. Upon energization of winding 120 by momentary closure of trim switch 122, this relay is actuated whereupon power is applied to line 118 and switch 108. As cams are being sensed, it will be evident that line 66–1 is positive during cam duration and line 66–2 is positive at all other times. Specifically, if the BLANK CLOSED cam is being read, line 52b energizes relay winding 112 actuating the relay and providing continuity between lines 116b and 66–1 As the trailing edge of the cam is read, winding 112 becomes deenergized whereupon continuity is provided between lines 66–2 and 116b.

The cam-indicating signals on lines 66–1 and 66–2 are applied to edge sensor 68 which includes relays 124, 126, 128 and 130. A leading edge trim demand signal is provided on line 92–1 to relay 128 and a trailing edge trim demand signal is applied to relay 124 over line 92–2. In response to selective energization of one or the other of relays 124 and 128, relays 126 and 130 operate to provide continuity between line 66–1 and output line 74 or between line 66–2 and output line 74. The operation of edge sensor 68 for both leading edge and trailing edge trimming will be considered below in detail.

Line 74 terminates in edge position generator 76 which is illustrated in block diagrammatic form in FIG. 2 and provides the aforementioned output signals on lines 78 through 86. Particular embodiments of unit 76 will be discussed in connection with FIGS. 4 and 5 hereinafter.

Edge-modifying matrix 88 is a multideck switch controlled by controller 62 and comprising deck control arms 132, 134, 136 and 138 respectively associated with fixed contact groups 140, 142, 144 and 146. Individual contacts of each group are selectively associated with one of the lines 78 through 86 to provide control arms 132 through 138 with different input signals based on the position thereof as dictated by controller 62. Each of these control arms 132 through 138 is associated with further control circuitry. Thus, arm 138 is connected to either line 92–1 or line 92–2 depending upon the setting of controller 62. Arm 136 places line 102 in selective communication with lines 82, 84 or 86 depending upon the controller setting and control arms 132 and 134 place write/erase signal generator 94 in selective communication with lines 78, 80 or 82 depending upon controller setting.

Write/erase signal generator 94 includes a writing relay 148 connected through line 150 to control arm 134 and includes an erase relay 152 connected by line 154 to arm 132. These relays include first normally open contacts for locking the relays in energized state and second normally open contacts selectively applying either a positive (writing) or negative (erasing) polarity to line 96. Line 96 is connected to section selector 98 which comprises a rotary switch 156, the control arm of which is positioned through linkage 100 by controller 60 to generate the aforementioned trimming signals on one of lines 56 for application to the writing heads 42 of FIG. 1. Write/erase signal generator 94 is further controlled by write/erase disable circuit 104 which includes a relay 158, the normally closed contacts of which interrupt energization of relay 120 and hence deenergize line 106 for deenergization of writing relay 148 or erasing relay 152.

In the embodiment of FIG. 3 it will be noted that the multideck switch of edge-modifying matrix 88 is provided with eight discrete positions by which the leading edge may be advanced or retarded by either 2° or 4° and by which the cam trailing edge may be advanced or retarded by 2° or 4°. In order to fully illustrate the operation of the entire circuit of FIG. 3, two exemplary trimming operations will be discussed, a first in which the leading edge of the SCOOP section cam will be advanced by 4° and a second in which the trailing edge of the BLANK CLOSED section cam will be advanced by 2°. Since the advancing of a leading edge is a writing function whereas the advancing of a trailing edge is an erasing function, both system functions will be indicated by the examples.

IV A. Trimming Operation (Write)

During normal machine operation, line 52a will be energized in repetitive manner from cycle to cycle in accordance with the cam stored in storage means 40a and read by reading head 44a. The SCOOP operation will thus start at precisely the same moment and end at precisely the same moment in each machine-operating cycle. In the present example, it is desired to advance by 4° the initiation of the SCOOP operation. The machine operator will set controller 60 such that line 118 is connected to line 116a. He will also set controller 62 to the fourth position thereof, i.e., "LE ADV–4." Positive potential will be applied through arm 138 and contact 146–4 to line 92–1 whereupon leading edge trim relay 128 will be energized. Lines 160 and 162 are connected to line 66–2 through the now-closed contacts of relay 128.

With initial conditions set into controllers 60 and 62, trim switch 122 is operated, energizing relay 120 and applying positive potential to switch 108 and to lines 166 and 168 through the now-closed contacts of relay 120. Presuming that the leading edge of the SCOOP section cam is approaching but has not yet been sensed by reading head 44a, line 52a is unenergized and relay 110 is off. The positive potential on line 116a provided by setting of the control arm of switch 108 is conducted through the normally closed contacts of relay 110 to line 66–2 whereupon relay 130 is energized through lines 160, 162 and 164. Since line 168 is energized, relay 130 is locked in its energized state by line 170, the now-closed contacts of relay 130, and line 172. By closure of the lowermost contacts of relay 130 lines 74 and 174 are placed in communication with line 176 and line 66–1. Since line 66–1 is unenergized, line 74 remains unenergized until the leading edge of the SCOOP section cam is sensed by reading head 44a whereupon line 52a energizes relay 110. A positive potential is thereby applied to line 66–1 through the now-closed upper contacts of relay 110 and a cam leading edge sensed signal is provided on line 74 indicating to edge position generator 76 that the leading edge of the SCOOP section cam is in position at the reading head 44a.

As mentioned previously, the reading and writing heads for each channel are spaced apart in the direction of cam travel such that a defined angular distance is traversed by the cam leading edge in its transit from the reading head to the writing head thereby permitting setup time for trimming information at the writing head. In a preferred embodiment, the storage means 40 are comprised by a plurality of pole pieces disposed about the periphery of a drum, 180 such pole pieces each defining 2° about the drum periphery. In this arrangement, the writing head is positioned 90° in advance of the reading head such that from the instant the reading head senses the cam leading edge, 45 pole pieces will pass the writing head before the pole piece containing the cam leading edge arrives at the writing head. Edge position generator 76 of FIGS. 2 and 3 is operatively responsive to electrical signals on line 74 indicating that the cam leading edge, in our example, is in position at the reading head and further mechanical signals provided by linkage 54 indicative of storage means rotation to provide signals on lines 78 through 86 indicating that the cam leading edge is approaching or departing the writing head. In the presently considered example, it is desired to enter additional cam information in advance of the cam leading edge and particularly in the pole pieces disposed 4° and 2° in advance of the pole piece containing the cam leading edge.

Referring to edge-modifying matrix 88 of FIG. 3, control arm 134 is positioned in contact with fixed contact 142-2 and thus line 150 will be energized as edge position generator 76 provides a signal on line 78 indicating the SCOOP section cam leading edge to be 4° in advance of writing head 42a. At this time, writing relay 148 is energized by line 150 and is immediately locked in its energized state by closure of the upper normally open contacts thereof, relay energizing potential being provided on line 106. Closure of the lower normally open contacts of relay 148 supplies positive potential to line 96 and through the contact arm of its switch 156 to line 56a. Continuance of the state of relay 148 results in the writing of information in the pole pieces respectively 4° and 2° in advance of the approaching cam leading edge. It will be observed that control arm 132 does not contact any of the fixed contacts 140 of matrix 88 and hence erasing relay 152 remains unenergized during this trimming operation.

While the cam-writing operation conducted by writing relay 148 may be continued throughout transit of the entire original cam past the writing head, it is preferred to discontinue the cam-writing operation upon completion of the writing of the revised cam leading edge. Thus, the writing operation is discontinued as edge position generator 76 energizes line 82, indicating that the original cam leading edge is now in position with the writing head. Line 82 is connected to fixed contact 144–4 and the line 82 signal is thereby conducted through control arm 136 to line 102 for energization of relay 158 of write/erase disable circuit 104. The normally closed contacts of this relay are opened and holding power provided by line 178, the lowermost contacts of relay 120 and line 180 to the winding of relay 120 is interrupted. Deenergization of relay 120 deenergizes lines 118 and 168 whereupon power is removed from section selector 58, the relays of edge sensor 68 are deenergized and writing relay 148 is deenergized. At this juncture, all activity of trimming system 50 is discontinued and the SCOOP section cam presently stored in storage means 40a differs from the previously stored SCOOP section cam in accordance with the trimming demands entered into controller 62.

IV B. Trimming Operation (Erase)

In the second trimming example, controller 62 is set such that the control arms 132–138 thereof are aligned with "TE ADV-2." Controller 60 is positioned to place lines 118 and 116b in communication, trimming being conducted in the BLANK CLOSED channel. Control arm 138 is in contact with fixed contact 146–6, applying a positive potential to line 92-2 and energizing trailing edge trimming relay 124. Trimming switch 122 is again momentarily operated to initiate the trimming operation and relay 120 is thereby energized. Presuming the BLANK CLOSED section cam to be approaching but not in registry with reading head 44b, relay 112 is unenergized and line 66-2 and line 180 are energized by connection through the normally closed contacts of relay 112 with line 116b. As the BLANK CLOSED cam is in residence with reading head 44b, the leading edge thereof is sensed and line 52b provides energizing signals to relay 112. Power is now applied through the now-closed, normally open contacts of relay 112 to line 66-1 lines 66-2 and 180 being deenergized thereby. Relay 126 is energized by connection through lines 184 and 186, the closed contacts of relay 124 and line 182 to line 66-1. As relay 126 is energized, a holding circuit therefor is provided through line 188 and the upper contacts of the relay. Energization of relay 126 also provides continuity between lines 180 and 190 through the now-closed lower contacts of relay 126. Since at this time line 66-2 is unenergized however, no signal is provided on line 74. Similarly, no energizing signal for relay 130 being derivable from line 66-2, no continuity is provided between lines 174 and 176 for energization of line 74. Line 74 thus continues to remain unenergized, in contrast to the above leading edge trimming example, during the entire duration of the BLANK CLOSED section cam reading by head 44b.

As the cam trailing edge passes reading head 44b, line 52b is deenergized, in turn deenergizing relay 112. Line 66-2 is thereby placed in communication with line 116b through the normally closed contacts of relay 112 whereupon line 180 applies to lines 190 and 74 a positive potential providing indication on line 74 that the cam trailing edge has immediately been read.

Edge position generator 76 now provides tracking of the cam trailing edge and generates on lines 78 through 86 signals indicating the advance of this cam trailing edge toward and past the writing head 42b.

To advance the trailing edge by 2°, it is desired to erase the last 2° of the entire cam thereby creating a new cam trailing edge 2° in advance of the prior cam trailing edge. For this purpose, control arm 132 of matrix 88 is in contact with fixed contact 140–4 which is in turn connected to line 80. As line 80 is energized, indicating that 2° of the cam remain, line 154 is energized, energizing erase relay 152. It will be noted that control arm 134 associated with relay 148 does not contact any of fixed contacts 142 in this controller 62 setting whereby no writing function is initiated. Energization of relay 152 results immediately in continued energization thereof through connection of the relay winding with line 106 through the upper normally open contacts thereof. Closure of the lower contacts applies to line 96 a negative potential which is conducted through switch 156 to line 56b thereby initiating erasure of the cam through writing/erase head 42b.

As edge position generator 76 energizes line 82, indicating that the original cam has passed the writing head 42b, fixed contact 144–6 applies to line 102 a positive potential, energizing relay 158. Thereupon all trimming system activity is discontinued by deenergization of relay 120 as in the above-discussed example.

While the foregoing examples have involved an advance of the trimmed cam edge in both instances, retardation of the trimmed cam edge is accomplished by substantially similar operation of the trimming control system. In the case of retardation of the cam leading edge, the cam leading edge is again sensed as in the above-discussed leading edge example. However, since the erasing function attends leading edge retardation, erasing relay 152 is energized at the time indicated by edge position generator 76. In the case of trailing edge retardation, a writing function is involved and writing relay 148 is energized.

V. Edge Position Generator—Electromechanical

Figure 4:
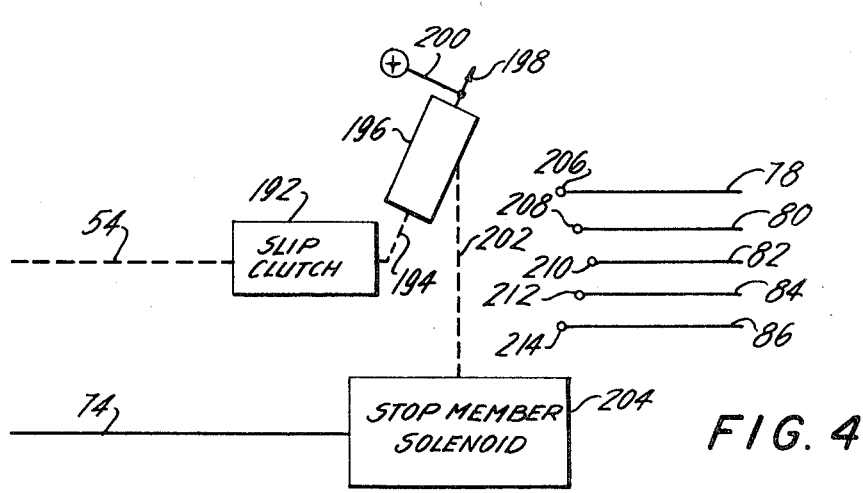
FIG. 4 is a functional block diagram of an electromechanical cam edge position sensor for use in the trimming system of FIG. 3.
Figure 5:
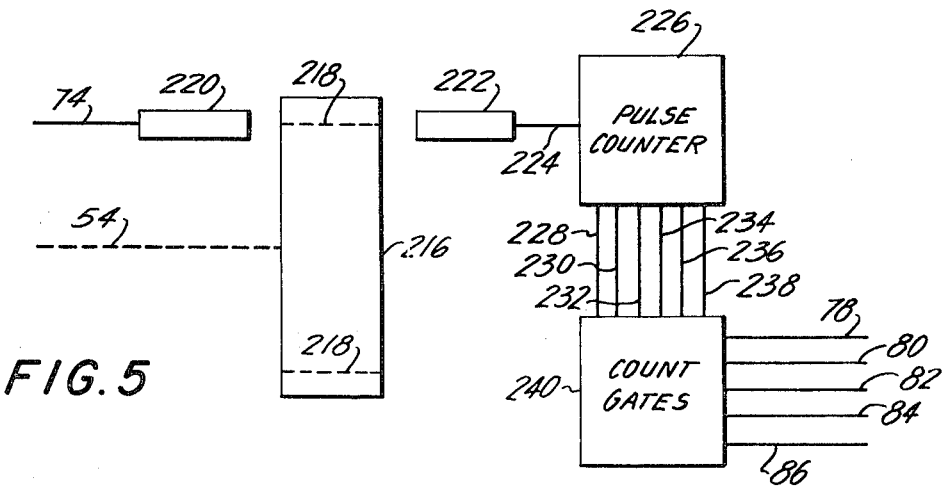
FIG. 5 is a functional block diagram of an electro-optical cam edge position sensor for use in the trimming system of FIG. 3.

Edge position generator 76 may take numerous forms, two of which are indicated in FIGS. 4 and 5. In FIG. 4, an electromechanical edge position generator is illustrated. Therein shaft 54 driven in synchronism with the cam storage drum is coupled to a slip clutch 192 the output shaft 194 of which drives a trimming arm 196. The trimming arm bears a contact member 198 which is continuously connected to a positive potential by line 200. Trimming arm 196 is selectively restrained and unrestrained by stop member 202 controlled by solenoid 204. Associated with contact member 198 are a plurality of fixed contacts 206 through 214 respectively connected to lines 78 through 86.

In operation of the position generator of FIG. 4, the line 74 signal, indicating that a selected cam edge has immediately passed the channel reading head, energizes solenoid 204 whereupon stop member 202 is displaced from its trim arm restraining position. Thereupon output linkage 194 is driven in synchronism with input link 54 and trim arm 196 tracks, i.e., moves in synchronism with, the selected cam edge. The geometrical relation of contact member 198 to fixed contact member 210 is selected to provide precisely the same angular distance between contact member 198 in trim arm restrained position and contact 210 as exists between the reading head and the writing head of each storage channel. Thus, as contact members 198 and 210 are aligned the selected cam edge is in precise registry with the writing head. Similarly, contact member 198 registers with fixed contacts 206 and 208 as the cam edge is respectively 4° and 2° in advance of the writing head and contact member 198 registers with fixed contacts 212 and 214 when the selective cam edge is respectively 2° and 4° beyond the writing head.

VI. Edge Position Generator—Electro-optical

Electro-optical structure for use in edge position generator 76 is illustrated in FIG. 5. In this arrangement, a light wheel 216 is driven by linkage 54 in fixed synchronism with the cam storage drum. Spaced about the periphery of wheel 216 are transmissive slots 218 At a fixed location about the wheel periphery and in alignment with slots 218 are positioned an illuminator 220 and a photoelectric cell 222. Upon generation of the cam edge indicating signal on line 74, illuminator 220 is energized. Cell 222 is thereafter pulsed repetitively as slots 218 pass between illuminator 220 and cell 222 resulting in the generation on line 224 of pulses each indicative of the passage of a single slot 218. Presuming 180 such slots about the periphery of wheel 216 and further assuming a 90° spacing between reading head 44 and writing head 42, it follows that 45 pulses on line 224 will establish that the cam sensed by reading head 44, the leading or trailing edge of which coincides with excitation of illuminator 220, will be in precise edge registry with writing head 42. A counter 226 is provided for counting of such pulses and provides at output lines 228 through 238 a binary-coded indication of cam edge position. Typically, counter 226 may comprise a six-stage binary counter, each counter thereof being connected to one of lines 228 through 238. Counting gates 240 are provided for receiving the counter output signals and selectively indicating various counts on lines 78 through 86. Line 78 will be energized at count 43 indicating the cam edge to be 4° in advance of the reading head. Similarly lines 78 through 86 may be energized at counts 44 through 47 for respectively indicating 2° advance, 0° (registration), 2° beyond and 4° beyond positions of the cam edge with respect to the writing head.

While edge position generator 76 has been illustrated by particular electromechanical and electro-optical embodiments therefor in FIGS. 4 and 5, it will be evident that same may be realized by electrical circuitry throughout. Similarly, whereas edge-modifying matrix 88, in FIG. 3 arrangement thereof, includes capacity for trimming by 4° at most, the matrix may be extended to any desired trimming degree capacity by inclusion therein of further contacts in each of fixed contact sets 140, 142, 144 and 146, additional cam edge position indicating lines beyond lines 78 through 86 and further conductors interconnecting such additional contacts and additional cam position indicating lines. Furthermore, while the system has been indicated by consideration of only three of the many sections involved in an I.S. machine, it will be evident that channels may be provided for any number of sections by inclusion of further storage means 40, signal generators 42 and 44, solenoids 30, valves 24 and associated lines. Such further sections may be trimmed by merely extending the capacity of section selectors 58 and 98. These modifications and other changes which will be evident to one skilled in the present art are within the contemplation of the present invention, the particularly preferred embodiments disclosed by way of the drawings and described in detail heretofore being intended in a descriptive and not in a limiting sense.

What is claimed is:

1. A system directing an I.S. machine individual section to operate in predetermined time relation within the machine cycle or in modified time relation therein upon demand indicated by control inputs comprising:

a. storage means containing magnetic signals arranged in said predetermined time relation;
   b. an electrical signal generator providing output signals corresponding to magnetic signals contained in said storage means;
   c. a section controller receiving said signal generator output signals and operating said section during occurrence thereof;
   d. trimming means receiving said signal generator output signals and said control inputs and generating electrical output signals having time relation to said signal generator output signals for conforming said contained magnetic signals to said modified time relation defined by said control inputs; and
   e. a magnetic signal generator receiving said trimming means output signals and applying corresponding magnetic signals to said storage means thereby conforming said contained magnetic signals to said modified time relation.

2. The system claimed in claim 1 wherein said storage means comprise a magnetic storage drum rotated in synchronism with the conveyor drive means of said machine, said contained magnetic signals being stored in a continuous portion of said drum periphery and defining a cam having said predetermined relation to said machine cycle.

3. The system claimed in claim 2 wherein said electrical signal generator output signals include a first signal time coincident with the leading edge of said cam and a second signal time coincident with the trailing edge of said cam, said section controller initiating section operation immediately upon receiving said first signal and discontinuing section operation immediately upon receiving said second signal.

4. The system claimed in claim 3 wherein said section controller includes a solenoid energized by said first signal and deenergized immediately upon receiving of said second signal, and a valve operated by said solenoid and conducting compressed air to said machine section during energization of said solenoid.

5. The system claimed in claim 3 wherein said control inputs indicate demands for time advancement of said cam leading edge or for time retardation of said cam trailing edge, magnetic signals being written in said storage means by first polarity electrical signals applied to said magnetic signal generator, said trimming means generating first polarity output signals in response to said control inputs.

6. The system claimed in claim 3 wherein said control inputs indicate demands for time retardation of said cam leading edge or for time advancement of said cam trailing edge, contained magnetic signals being erased from said storage means by second polarity electrical signals applied to said magnetic signal generator, said trimming means generating second polarity output signals in response to said control inputs.

7. A system providing signals initiating and discontinuing the the operation of an I.S. machine section controller during a machine-operating cycle and varying the time of occurrence of said signals in said cycle in response to control signals requiring time advancement or time retardation in said cycle of either said initiation or discontinuance comprising:

a. storage means rotated in synchronism with the conveyor drive means of said machine and containing a continuous magnetic cam;
   b. a first signal generator fixedly positioned with respect to said storage means and generating electrical output signals corresponding to said cam, including signals respectively indicative of the leading edge and the trailing edge of said cam, said leading edge signal constituting said operation-initiating signal and said trailing edge signal constituting said operation-discontinuing signal;
   c. cam-trimming means connected to said machine conveyor drive means and receiving said first signal generator output signals and said control signals and operatively responsive thereto to generate electrical output signals for advancement or retardation of said cam leading edge or said cam trailing edge; and d. a second signal generator fixedly positioned with respect to said storage means and spaced in the direction of rotation thereof from said first transducer, said second signal generator receiving said cam-trimming means output signals and generating corresponding magnetic signals advancing or retarding said cam leading edge or said cam trailing edge.

8. The system claimed in claim 7 wherein said cam-trimming means comprises:

a. first means operatively responsive to said control signal to selectively regenerate either said cam leading edge signal or said cam trailing edge signal;

b. second means operatively responsive to said first means output signal and to said machine conveyor drive means to generate signals indicative of the angular position of said first means selected contained cam edge with respect to said second transducer; and c. third means operatively responsive to said control signals and to said second means output signals to generate said signals for advancement or retardation of said cam edge selected by said first means.

* * * * *